US012670635B2

(12) United States Patent
Li et al.

(10) Patent No.: US 12,670,635 B2
(45) Date of Patent: Jun. 30, 2026

(54) MACHINE LEARNING METHOD

(71) Applicants: HON HAI PRECISION INDUSTRY CO., LTD., New Taipei City (TW); Foxconn Technology Group Co., Ltd., Guangdong Province (CN)

(72) Inventors: Yung-Hui Li, New Taipei City (TW); Van Nhiem Tran, New Taipei City (TW); Chi-En Huang, New Taipei City (TW); Shen-Hsuan Liu, New Taipei City (TW); Muhammad Saqlain Aslam, New Taipei City (TW); Kai-Lin Yang, New Taipei City (TW)

(73) Assignees: HON HAI PRECISION INDUSTRY CO., LTD., New Taipei cITY (TW); Foxconn Technology Group Co., Ltd., Guangdong Province (CN)

( * ) Notice: Subject to any disclaimer, the term of this patent is extended or adjusted under 35 U.S.C. 154(b) by 203 days.

(21) Appl. No.: 18/788,184

(22) Filed: Jul. 30, 2024

(65) Prior Publication Data

US 2025/0037324 A1 Jan. 30, 2025

Related U.S. Application Data

(60) Provisional application No. 63/516,530, filed on Jul. 30, 2023.

(51) Int. Cl.
*G06T 11/00* (2026.01)
*G06V 10/774* (2022.01)

(52) U.S. Cl.
CPC .......... *G06T 11/00* (2013.01); *G06T 2210/22* (2013.01); *G06V 10/774* (2022.01)

(58) Field of Classification Search
CPC .... G06T 11/00; G06T 2210/22; G06V 10/774
See application file for complete search history.

(56) References Cited

U.S. PATENT DOCUMENTS

| | | | | |
|---|---|---|---|---|
| 11,334,971 | B2 * | 5/2022 | Lin | G06V 10/82 |
| 11,854,203 | B1 * | 12/2023 | Gafni | G06T 7/70 |
| 11,934,958 | B2 * | 3/2024 | Shu | G06T 5/40 |

(Continued)

FOREIGN PATENT DOCUMENTS

| | | |
|---|---|---|
| TW | 201832179 A | 9/2018 |
| TW | 202224423 A | 6/2022 |

*Primary Examiner* — Charles L Beard
(74) *Attorney, Agent, or Firm* — CKC & Partners Co., LLC

(57) ABSTRACT

A machine learning method includes: processing a first global image and a first local image by a first augmentation pipeline to generate a first augmentation global image and a first augmentation local image; processing the first global image by a second augmentation pipeline to generate a second augmentation global image; processing the first augmentation global image to generate a first global representation vector; processing the second augmentation global image and the first augmentation local image to generate a second global representation vector and a first local representation vector; comparing the first and second global representation vectors to generate a global loss function; comparing the first global representation vector and the first local representation vector to generate a mixed loss function; and adjusting the second encoder according to the global loss function and the mixed loss function.

20 Claims, 8 Drawing Sheets

(56) References Cited

U.S. PATENT DOCUMENTS

| | | | | |
|---|---|---|---|---|
| 11,978,191 | B1 * | 5/2024 | Gangirevula | G06T 7/0004 |
| 12,056,841 | B2 * | 8/2024 | Qin | G06T 7/194 |
| 12,148,131 | B2 * | 11/2024 | Chen | G06T 5/60 |
| 12,148,157 | B1 * | 11/2024 | Li | G06T 7/0012 |
| 12,282,987 | B2 * | 4/2025 | Liu | G06V 10/44 |
| 12,354,335 | B1 * | 7/2025 | Lillywhite | G06V 10/7747 |
| 2016/0034788 | A1 * | 2/2016 | Lin | G06V 10/82 382/157 |
| 2016/0035078 | A1 * | 2/2016 | Lin | G06V 10/772 382/157 |
| 2019/0171908 | A1 * | 6/2019 | Salavon | G06V 10/82 |
| 2020/0005511 | A1 * | 1/2020 | Kavidayal | G06T 13/80 |
| 2020/0104645 | A1 * | 4/2020 | Ionescu | G06N 3/0495 |
| 2020/0118423 | A1 * | 4/2020 | Moura | G08G 1/0129 |
| 2020/0342328 | A1 * | 10/2020 | Revaud | G06N 3/09 |
| 2020/0364910 | A1 * | 11/2020 | Price | G06T 11/00 |
| 2020/0380652 | A1 * | 12/2020 | Olaleye | G06T 11/00 |
| 2021/0118129 | A1 * | 4/2021 | Kearney | A61B 6/5217 |
| 2021/0142052 | A1 | 5/2021 | James et al. | |
| 2021/0217219 | A1 * | 7/2021 | Zhou | G06T 15/04 |
| 2021/0326660 | A1 * | 10/2021 | Krishnan | G06V 10/454 |
| 2021/0327029 | A1 * | 10/2021 | Chen | G06T 11/60 |
| 2021/0334935 | A1 * | 10/2021 | Grigoriev | G06T 15/205 |
| 2021/0374553 | A1 * | 12/2021 | Li | G06N 3/088 |
| 2021/0383242 | A1 * | 12/2021 | Ostyakov | G06T 7/11 |
| 2022/0122308 | A1 * | 4/2022 | Kalarot | G06F 3/04845 |
| 2022/0129670 | A1 * | 4/2022 | Lin | G06V 10/764 |
| 2022/0157014 | A1 * | 5/2022 | Sevastopolskiy | G06N 3/084 |
| 2022/0180602 | A1 * | 6/2022 | Hao | G06V 20/647 |
| 2022/0189170 | A1 * | 6/2022 | Zhu | G06V 10/806 |
| 2022/0198721 | A1 * | 6/2022 | Melnik | G06N 3/08 |
| 2022/0262009 | A1 * | 8/2022 | Yu | G06T 5/92 |
| 2022/0269946 | A1 * | 8/2022 | Zhou | G06N 3/084 |
| 2022/0270397 | A1 * | 8/2022 | Zhou | G06V 10/762 |
| 2022/0292654 | A1 * | 9/2022 | Zhang | G06T 5/50 |
| 2022/0296081 | A1 * | 9/2022 | Nygaard Espeland | G06V 20/46 |
| 2022/0374658 | A1 * | 11/2022 | Chen | G06F 18/2155 |
| 2022/0392025 | A1 * | 12/2022 | Mironica | G06N 3/045 |
| 2023/0037591 | A1 * | 2/2023 | Villegas | G06T 15/506 |
| 2023/0046274 | A1 * | 2/2023 | Chen | G01S 13/931 |
| 2023/0051749 | A1 * | 2/2023 | Li | G06T 11/60 |
| 2023/0053588 | A1 * | 2/2023 | Li | G06V 10/52 |
| 2023/0068103 | A1 * | 3/2023 | Zhou | G06F 16/583 |
| 2023/0074706 | A1 * | 3/2023 | Xiao | G06V 30/1444 |
| 2023/0087476 | A1 * | 3/2023 | Liu | G06V 10/24 382/159 |
| 2023/0120232 | A1 * | 4/2023 | Price | G06T 11/60 345/619 |
| 2023/0143874 | A1 * | 5/2023 | Lee | G06V 10/82 382/157 |
| 2023/0146181 | A1 * | 5/2023 | Meshkin | G06T 5/90 382/274 |
| 2023/0196755 | A1 * | 6/2023 | He | G06V 10/7715 382/156 |
| 2023/0215546 | A1 * | 7/2023 | Ceballos Lentini | G16H 30/40 705/2 |
| 2023/0222762 | A1 * | 7/2023 | Andriushchenko | G06V 10/774 382/209 |
| 2023/0267652 | A1 * | 8/2023 | Lupascu | G06T 11/00 345/428 |
| 2023/0298148 | A1 * | 9/2023 | Zhang | G06T 5/50 382/156 |
| 2023/0298371 | A1 * | 9/2023 | Rezaeian | G06N 3/084 382/159 |
| 2023/0316474 | A1 * | 10/2023 | Qu | G06T 11/60 |
| 2023/0325975 | A1 * | 10/2023 | Zhi | G06N 3/0455 |
| 2023/0343068 | A1 * | 10/2023 | Yao | G06N 3/08 |
| 2023/0351807 | A1 * | 11/2023 | Ren | G06V 20/40 |
| 2023/0368025 | A1 * | 11/2023 | Lubana | G06N 3/0464 |
| 2023/0368339 | A1 * | 11/2023 | Zheng | G06T 5/77 |
| 2023/0376729 | A1 * | 11/2023 | Zhou | G06N 3/0895 |
| 2023/0377213 | A1 * | 11/2023 | Naruniec | G06T 11/00 |
| 2024/0013564 | A1 * | 1/2024 | Kim | G06V 10/454 |
| 2024/0029460 | A1 * | 1/2024 | Brown | G06V 10/82 |
| 2024/0071058 | A1 * | 2/2024 | Amthor | G06V 10/768 |
| 2024/0096072 | A1 * | 3/2024 | He | G06V 10/26 |
| 2024/0112088 | A1 * | 4/2024 | Yu | G06N 20/00 |
| 2024/0127410 | A1 * | 4/2024 | Lin | G06T 5/77 |
| 2024/0127412 | A1 * | 4/2024 | Lin | G06T 7/11 |
| 2024/0127452 | A1 * | 4/2024 | Lin | G06V 10/82 |
| 2024/0135509 | A1 * | 4/2024 | Liu | G06T 5/77 |
| 2024/0135512 | A1 * | 4/2024 | Singh | G06F 3/04842 |
| 2024/0144489 | A1 * | 5/2024 | Nguyen | G06T 7/248 |
| 2024/0161240 | A1 * | 5/2024 | Zhang | G06V 10/82 |
| 2024/0177286 | A1 * | 5/2024 | Guo | G01N 21/9501 |
| 2024/0202907 | A1 * | 6/2024 | Manikani | G06V 10/82 |
| 2024/0212811 | A1 * | 6/2024 | Vogler | G06N 3/084 |
| 2024/0223742 | A1 * | 7/2024 | Xiong | G06T 19/006 |
| 2024/0257421 | A1 * | 8/2024 | Smith | G06V 10/86 |
| 2024/0257431 | A1 * | 8/2024 | Moser | G06T 3/18 |
| 2024/0303770 | A1 * | 9/2024 | Zhu | G06T 3/4053 |
| 2024/0331094 | A1 * | 10/2024 | Pouyanfar | G06T 5/50 |
| 2024/0331322 | A1 * | 10/2024 | Smith | G06T 13/40 |
| 2024/0331362 | A1 * | 10/2024 | Ouyang | G06V 10/774 |
| 2024/0357118 | A1 * | 10/2024 | Wang | H04N 19/132 |
| 2024/0362815 | A1 * | 10/2024 | Joachim | G06T 11/00 |
| 2024/0378912 | A1 * | 11/2024 | Sarkar | G06V 10/46 |
| 2024/0404104 | A1 * | 12/2024 | Revaud | G06V 20/70 |
| 2024/0419382 | A1 * | 12/2024 | Dekel | G06V 20/70 |
| 2024/0420288 | A1 * | 12/2024 | He | G06F 18/00 |
| 2024/0428482 | A1 * | 12/2024 | Khodadadeh | G06T 3/18 |
| 2025/0005296 | A1 * | 1/2025 | Goswami | G06V 10/7715 |
| 2025/0005839 | A1 * | 1/2025 | Li | G06T 17/00 |
| 2025/0022256 | A1 * | 1/2025 | Welsh | G06T 5/50 |
| 2025/0029289 | A1 * | 1/2025 | Bai | G06T 11/00 |
| 2025/0045975 | A1 * | 2/2025 | Portman | G06N 3/0455 |
| 2025/0054164 | A1 * | 2/2025 | Singh | G06T 7/162 |
| 2025/0117893 | A1 * | 4/2025 | Steiner | G06T 5/60 |
| 2025/0166311 | A1 * | 5/2025 | Montero, Jr. | G06T 19/003 |
| 2025/0173519 | A1 * | 5/2025 | Chiang | G06F 16/383 |
| 2025/0182326 | A1 * | 6/2025 | Wen | G06T 7/73 |
| 2025/0191348 | A1 * | 6/2025 | Qiu | G06T 7/11 |
| 2025/0209701 | A1 * | 6/2025 | Hwang | G06T 11/60 |
| 2025/0209796 | A1 * | 6/2025 | Pobitzer | G06V 10/82 |
| 2025/0245878 | A1 * | 7/2025 | Pernias Pascual de Pobil | G06T 11/10 |
| 2025/0245886 | A1 * | 7/2025 | Pesko | G06V 10/82 |
| 2025/0259321 | A1 * | 8/2025 | Antsfeld | G06T 7/55 |
| 2025/0265781 | A1 * | 8/2025 | Baradel | G06T 17/20 |
| 2025/0292551 | A1 * | 9/2025 | Gao | G06T 7/0012 |
| 2025/0299506 | A1 * | 9/2025 | Miri | G06T 7/0012 |
| 2025/0308109 | A1 * | 10/2025 | Nitzan | G06T 11/60 |
| 2025/0336119 | A1 * | 10/2025 | Wang | G06T 5/60 |
| 2025/0337657 | A1 * | 10/2025 | Zhu | G01S 13/003 |
| 2025/0348674 | A1 * | 11/2025 | Borse | G06N 3/0475 |
| 2025/0348979 | A1 * | 11/2025 | Park | G06T 5/60 |
| 2025/0356562 | A1 * | 11/2025 | Zhang | G06T 13/20 |
| 2025/0378198 | A1 * | 12/2025 | Shamshad | G06F 21/6254 |
| 2026/0017967 | A1 * | 1/2026 | Kim | G06V 10/774 |
| 2026/0045005 | A1 * | 2/2026 | Chakrabarty | G06T 11/23 |
| 2026/0057564 | A1 * | 2/2026 | Sadr | G06T 11/00 |
| 2026/0057670 | A1 * | 2/2026 | Huang | G06V 10/764 |
| 2026/0065649 | A1 * | 3/2026 | Huang | G06V 10/774 |
| 2026/0073657 | A1 * | 3/2026 | El-Khamy | G06V 10/26 |

* cited by examiner

MACHINE LEARNING METHOD

CROSS-REFERENCE TO RELATED APPLICATION

This application claims priority to U.S. Provisional Application Ser. No. 63/516,530, filed Jul. 30, 2023, which is herein incorporated by reference in its entirety.

BACKGROUND

Technical Field

The present disclosure relates to a machine learning technology. More particularly, the present disclosure relates to a machine learning method.

Description of Related Art

Self-supervised learning includes a pretraining phase and a fine-tune phase. During the pretraining phase, users, use unlabeled dataset to pretrain an encoder. However, differences between images of pretraining are smaller. Thus, techniques associated with the development for overcoming problems described above are important issues in the field.

SUMMARY

The present disclosure provides a machine learning method. The machine learning method includes: cropping an original image to generate a first global image; cropping the original image to generate a first local image; processing the first global image by a first augmentation pipeline to generate a first augmentation global image; processing the first global image by a second augmentation pipeline to generate a second augmentation global image; processing the first local image by the first augmentation pipeline to generate a first augmentation local image; processing the first augmentation global image by a first encoder to generate a first global representation vector; processing the second augmentation global image and the first augmentation local image by a second encoder to generate a second global representation vector and a first local representation vector; at least comparing the first global representation vector and the second global representation vector to generate a global loss function; comparing the first global representation vector and the first local representation vector to generate a mixed loss function; and adjusting the second encoder according to the global loss function and the mixed loss function. The first augmentation pipeline is different from the second augmentation pipeline.

The present disclosure also provides a machine learning method. The machine learning method includes: cropping an original image to generate a first global image and a second global image; cropping the original image to generate a first local image and a second local image; processing the first global image and the second global image by an augmentation pipeline to generate a first augmentation global image and a second augmentation global image; processing the first local image and the second local image by the augmentation pipeline to generate a first augmentation local image and a second augmentation local image; processing the first augmentation global image and the second augmentation global image by a first encoder to generate a first global representation vector and a second global representation vector; processing the first augmentation local image and the second augmentation local image by a second encoder to generate a first local representation vector and a second local representation vector; at least comparing the first global representation vector, the second global representation vector and the first local representation vector, the second local representation vector to generate a mixed loss function; and adjusting the second encoder according to the mixed loss function.

The present disclosure also provides a machine learning method. The machine learning method includes: cropping an original image to generate a first global image; cropping the original image to generate a first local image; processing the first global image by a first augmentation pipeline and a second augmentation pipeline to generate a first augmentation global image and a second augmentation global image; processing the first local image by the first augmentation pipeline and the second augmentation pipeline to generate a first augmentation local image and a second augmentation local image; processing the first global image by a third augmentation pipeline and a fourth augmentation pipeline to generate a third augmentation global image and a fourth augmentation global image; processing the first local image by the third augmentation pipeline and the fourth augmentation pipeline to generate a third augmentation local image and a fourth augmentation local image; processing the first augmentation global image, the second augmentation global image, the first augmentation local image and the second augmentation local image by a first encoder to generate a first global representation vector, a second global representation vector, a first local representation vector and a second local representation vector; processing the third augmentation global image, the fourth augmentation global image, the third augmentation local image and the fourth augmentation local image by a second encoder to generate a third global representation vector, a fourth global representation vector, a third local representation vector and a fourth local representation vector; comparing the first global representation vector, the second global representation vector and the third global representation vector, the fourth global representation vector to generate a global loss function; comparing the first local representation vector, the second local representation vector and the third local representation vector, the fourth local representation vector to generate a local loss function; summing the global loss function and the local loss function to generate a multi-view loss function; and adjusting the second encoder according to the multi-view loss function.

It is to be understood that both the foregoing general description and the following detailed description are by examples, and are intended to provide further explanation of the disclosure as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
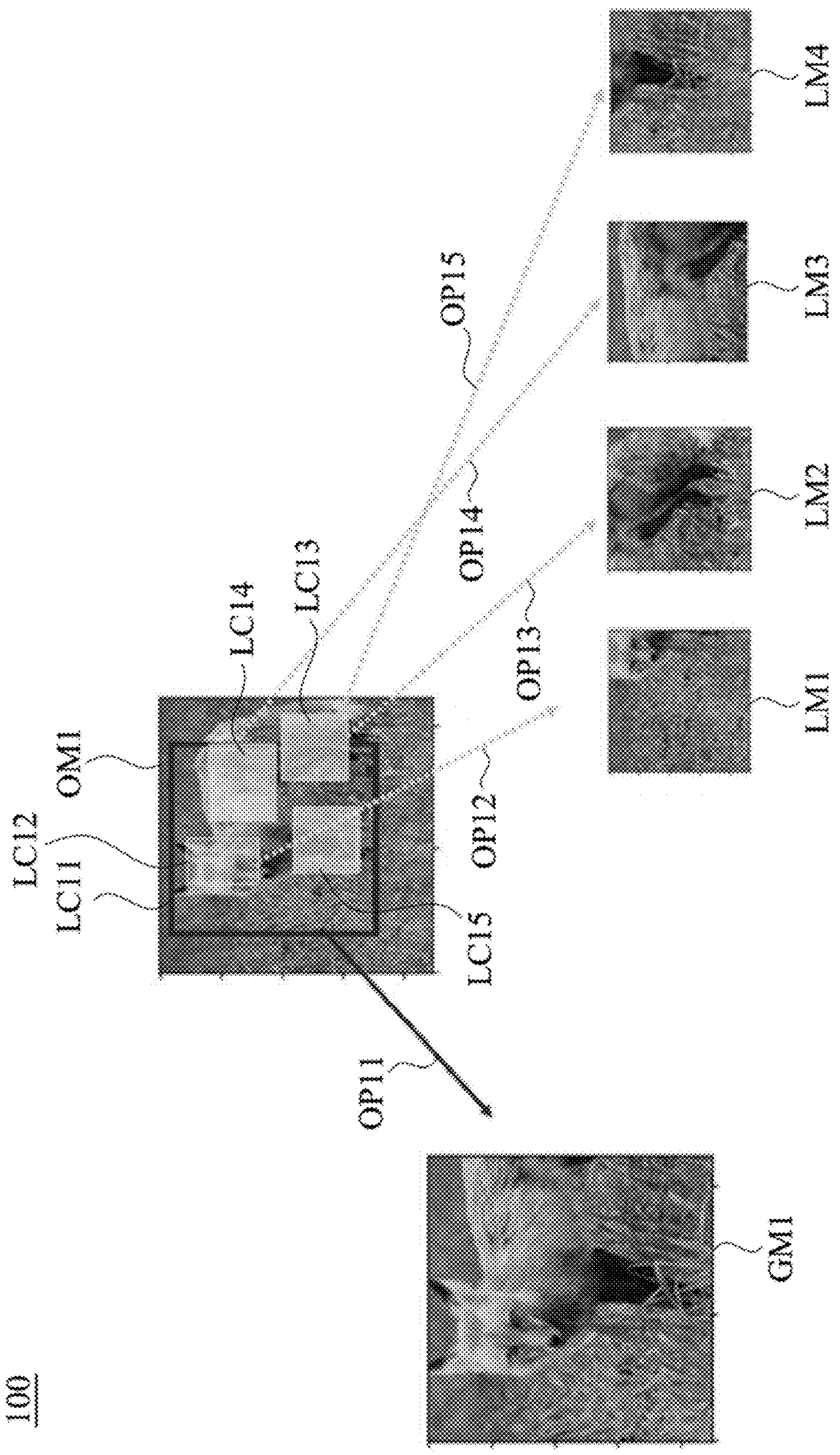
FIG. 1 is a schematic diagram of a method of processing images, illustrated according to some embodiment of this disclosure.

In the present disclosure, although the terms "first", "second", and the like are used in the present disclosure to describe different elements, the terms are used only to distinguish the elements or operations described in the same technical terms. The use of the term is not intended to be a limitation of the present disclosure.

Unless otherwise defined, all terms (including technical and scientific terms) used in the present disclosure have the same meaning as commonly understood by the ordinary skilled person to which the concept of the present invention belongs. It will be further understood that terms (such as those defined in commonly used dictionaries) should be interpreted as having a meaning consistent with its meaning in the related technology and/or the context of this specification and not it should be interpreted in an idealized or overly formal sense, unless it is clearly defined as such in this article.

The terms used in the present disclosure are only used for the purpose of describing specific embodiments and are not intended to limit the embodiments. As used in the present disclosure, the singular forms "a", "one" and "the" are also intended to include plural forms, unless the context clearly indicates otherwise. It will be further understood that when used in this specification, the terms "comprises (comprising)" and/or "includes (including)" designate the existence of stated features, steps, operations, elements and/or components, but the existence or addition of one or more other features, steps, operations, elements, components, and/or groups thereof are not excluded.

Hereinafter multiple embodiments of the present disclosure will be disclosed with schema, as clearly stated, the details in many practices it will be explained in the following description. It should be appreciated, however, that the details in these practices is not applied to limit the present disclosure. Also, it is to say, in some embodiments of the present disclosure, the details in these practices are non-essential. In addition, for the sake of simplifying schema, some known usual structures and element in the drawings by a manner of simply illustrating for it.

FIG. 1 is a schematic diagram of a method 100 of processing images, illustrated according to some embodiment of this disclosure. In some embodiments, the method 100 can performed by a memory, a processor and/or various processing circuit (not shown in figures). As illustratively shown in FIG. 1, the method 100 can include operations OP11-OP15.

During the operation OP11, the processor is configured to crop an original image OM1 to generate a global image GM1. In some embodiments, the processor randomly selects two ratio values GR11 and GR12 (not shown in figures) between crop threshold ratios CTHR1 and CTHR2 (not shown in figures). In which the crop threshold ratio CTHR1 is smaller than the crop threshold ratio CTHR2.

Then, the processor is configured to randomly select a location LC11 in the original image OM1, and crop the original image OM1 according to the ratio values GR11 and GR12, to generate the global image GM1. A length of the global image GM1 is a length of the original image OM1 multiplied by the ratio value GR11, and a width of the global image GM1 is a width of the original image OM1 multiplied by the ratio value GR12. In the embodiment shown in FIG. 1, the length corresponds to the vertical direction, and the width corresponds to the horizontal direction.

For example, the crop threshold ratios CTHR1 and CTHR2 can be 0.3 and 1.0, respectively. The processor selects two ratio values between crop threshold ratios CTHR1 and CTHR2, such as 0.4 and 0.9 as the ratio values GR11 and GR12, respectively. Correspondingly, the length of the global image GM1 is the length of the original image OM1 multiplied by 0.4, and the width of the global image GM1 is the width of the original image OM1 multiplied by 0.9.

During the operation OP12, the processor is configured to crop the original image OM1 to generate a local image LM1. In some embodiments, the processor randomly selects two ratio values LR11 and LR12 (not shown in figures) between crop threshold ratios CTHR3 and CTHR4 (not shown in figures). In which the crop threshold ratio CTHR3 is smaller than the crop threshold ratio CTHR4. In some embodiments, the crop threshold ratio CTHR4 is equal to the crop threshold ratio CTHR1.

Then, the processor is configured to randomly select a location LC12 in the original image OM1, and crop the original image OM1 according to the ratio values LR11 and LR12, to generate the local image LM1. A length of the local image LM1 is the length of the original image OM1 multiplied by the ratio value LR11, and a width of the local image LM1 is the width of the original image OM1 multiplied by the ratio value LR12.

For example, the crop threshold ratios CTHR3 and CTHR4 can be 0.1 and 0.3, respectively. The processor selects two ratio values between crop threshold ratios CTHR3 and CTHR4, such as 0.15 and 0.2 as the ratio values LR11 and LR12, respectively. Correspondingly, the length of the local image LM1 is the length of the original image OM1 multiplied by 0.15, and the width of the local image LM1 is the width of the original image OM1 multiplied by 0.2.

Similarly, during the operation OP13, the processor is configured to crop the original image OM1 to generate a local image LM2. In some embodiments, the processor randomly selects two ratio values LR13 and LR14 between crop threshold ratios CTHR3 and CTHR4.

Then, the processor is configured to randomly select a location LC13 in the original image OM1, and crop the original image OM1 according to the ratio values LR13 and LR14, to generate the local image LM2. A length of the local image LM2 is the length of the original image OM1 multiplied by the ratio value LR13, and a width of the local image LM2 is the width of the original image OM1 multiplied by the ratio value LR14.

Similarly, during the operation OP14, the processor is configured to crop the original image OM1 to generate a local image LM3. In some embodiments, the processor randomly selects two ratio values LR15 and LR16 between crop threshold ratios CTHR3 and CTHR4.

Then, the processor is configured to randomly select a location LC14 in the original image OM1, and crop the original image OM1 according to the ratio values LR15 and LR16, to generate the local image LM3. A length of the local image LM3 is the length of the original image OM1 multiplied by the ratio value LR15, and a width of the local image LM3 is the width of the original image OM1 multiplied by the ratio value LR16.

Similarly, during the operation OP15, the processor is configured to crop the original image OM1 to generate a local image LM4. In some embodiments, the processor randomly selects two ratio values LR17 and LR18 between crop threshold ratios CTHR3 and CTHR4.

Then, the processor is configured to randomly select a location LC15 in the original image OM1, and crop the original image OM1 according to the ratio values LR17 and LR18, to generate the local image LM4. A length of the local image LM4 is the length of the original image OM1 multiplied by the ratio value LR17, and a width of the local image LM4 is the width of the original image OM1 multiplied by the ratio value LR18. In some embodiments, the local images LM1-LM4 are different from each other.

In various embodiments, the crop threshold ratios CTHR1-CTHR4 can have various values. For example, the crop threshold ratio CTHR1 can be 0.4, 0.3 or 0.5. The crop threshold ratio CTHR3 can be 0.1 or 0.2. The crop threshold ratio CTHR4 can be 0.4, 0.3 or 0.5. In which a configuration having better performance is that each of the crop threshold ratios CTHR1 and CTHR4 is 0.3, the crop threshold ratio CTHR2 is 1.0 and the crop threshold ratio CTHR3 is 0.1.

In some embodiments, the method 100 can be configured to generate multiple cropping augmentation images of global view and local view, such as the global image GM1 and the local images LM1-LM4. Correspondingly, the method 100 can be referred to as a method of multi-view cropping augmentation.

Figure 2:
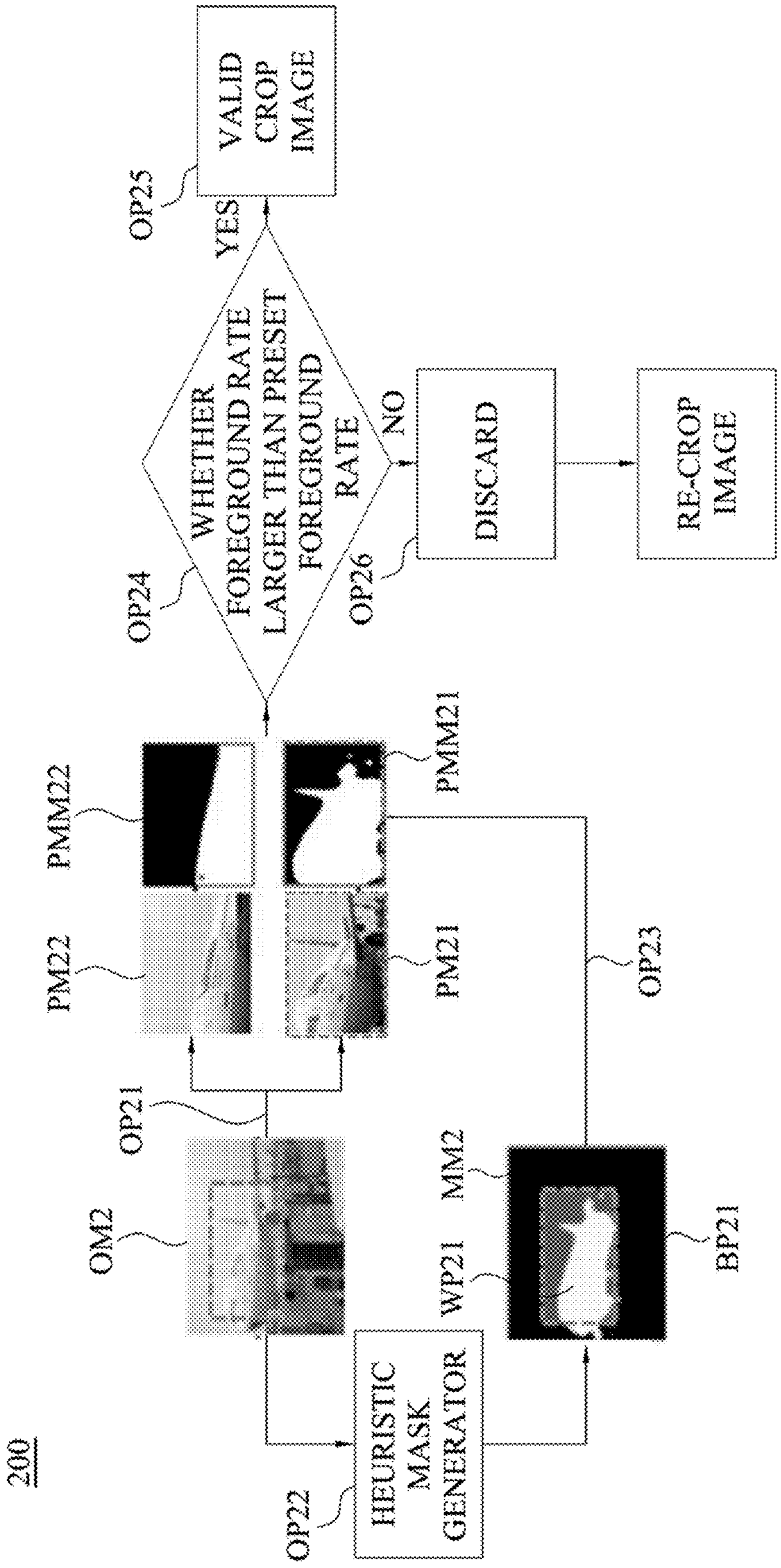
FIG. 2 is a schematic diagram of a method of processing images, illustrated according to some embodiment of this disclosure.

FIG. 2 is a schematic diagram of a method 200 of processing images, illustrated according to some embodiment of this disclosure. In some embodiments, the method 200 can performed by a memory, a processor and/or various processing circuit (not shown in figures). As illustratively shown in FIG. 2, the method 200 can include operations OP21-OP26.

During the operation OP21, the processor is configured to crop an original image OM2 to generate a portion image PM21. Referring to FIG. 1 and FIG. 2, the original image OM2 is an embodiment of the original image OM1, the portion image PM21 is an embodiment of one of the global image GM1 and the local images LM1-LM4, and the operation OP21 is an embodiment of one of the operations OP11-OP15. Therefore, some descriptions are not repeated.

During the operation OP22, the processor is configured to process the original image OM2 by a heuristic mask generator, to generate a mask image MM2. The mask image MM2 includes a white portion WP21 corresponding to foreground and a black portion BP21 corresponding to background. In some embodiments, the white portion WP21 has the logic value 1 and the black portion BP21 has the logic value 0.

During the operation OP23, the processor is configured to crop the mask image MM2 according to a relationship between the portion image PM21 and the original image OM2, to generate a portion mask image PMM21. A location and an area of the portion image PM21 on the original image OM2 are equal to a location and an area of the portion mask image PMM21 on the mask image MM2. The portion mask image PMM21 includes a white portion WP22 corresponding to foreground and a black portion BP22 corresponding to background.

During the operation OP24, the processor is configured to determine a foreground rate of the portion image PM21 according to the white portion WP22 and the black portion BP22, and compare the foreground rate of the portion image PM21 with a preset foreground rate. When the foreground rate of the portion image PM21 is larger than the preset foreground rate, the processor performs the operation OP25 after the operation OP24. When the foreground rate of the portion image PM21 is smaller than or equal to the preset foreground rate, the processor performs the operation OP26 after the operation OP24.

In some embodiments, the foreground rate is an area of the white portion WP22 divided by an area of the portion mask image PMM21. In which the area of the portion mask image PMM21 is the area of the white portion WP22 plus an area of the black portion BP22. In some embodiments, the preset foreground rate is 0.3.

Figure 5:
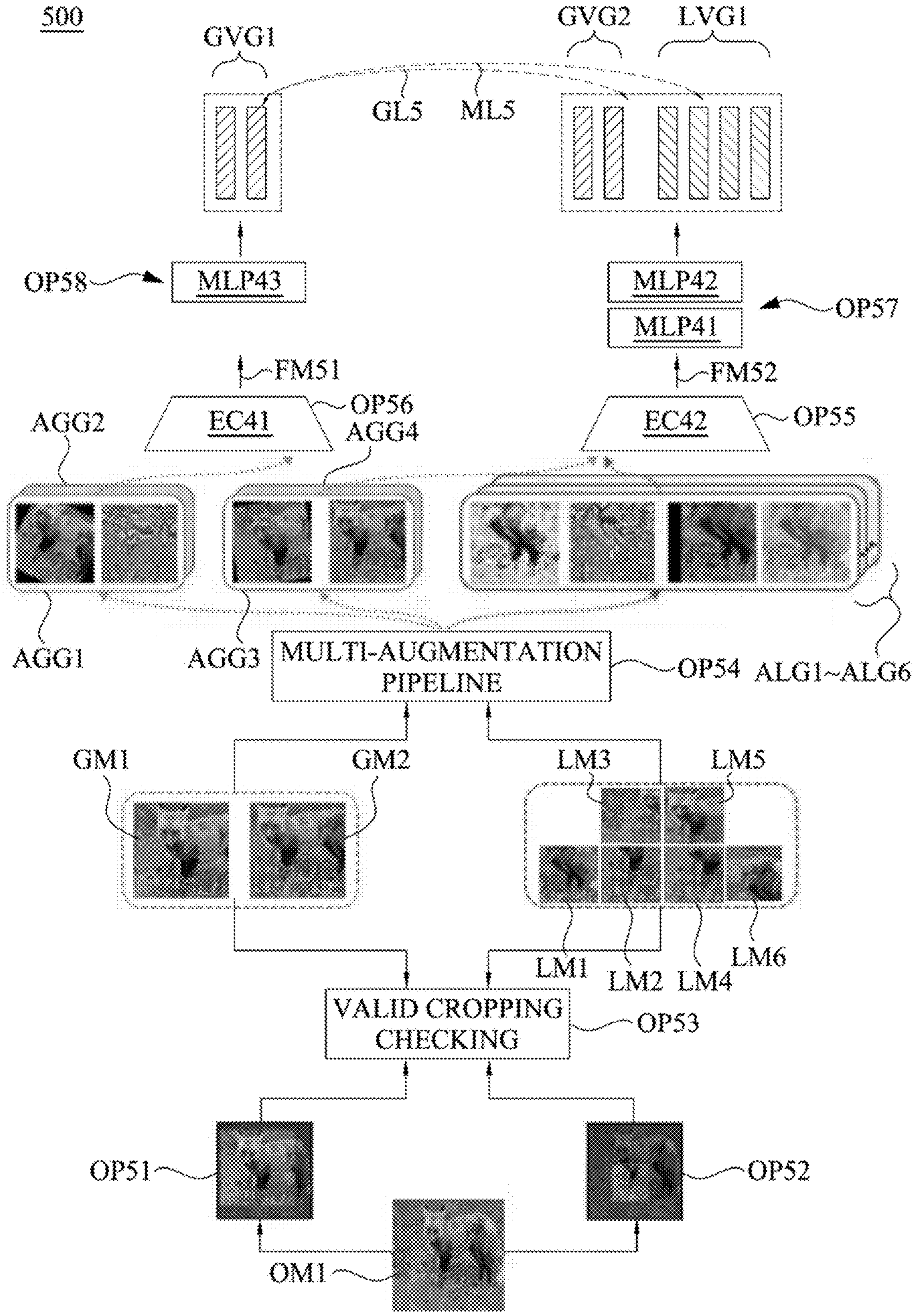
FIG. 5 is a schematic diagram of a machine learning method, illustrated according to some embodiment of this disclosure.

During the operation OP25, the processor is configured to determine the portion image PM21 as a valid cropped image, and perform following operations to the portion image PM21, such as the operations OP54-OP58 shown in FIG. 5.

During the operation OP26, the processor is configured to discard the portion image PM21, such as delete the portion image PM21 from the memory. After the operation OP26, the processor is configured to perform the operation OP21 again, to crop a new portion image for performing the operations OP22-OP24 again.

For example, after the processor discards the portion image PM21, the processor crops the original image OM2 again to generate a portion image PM22, and performs the operation OP23 to generate a portion mask image PMM22 corresponding to the portion image PM22. Then, the processor performs the operation OP24 to the portion mask image PMM22.

Figure 3A:
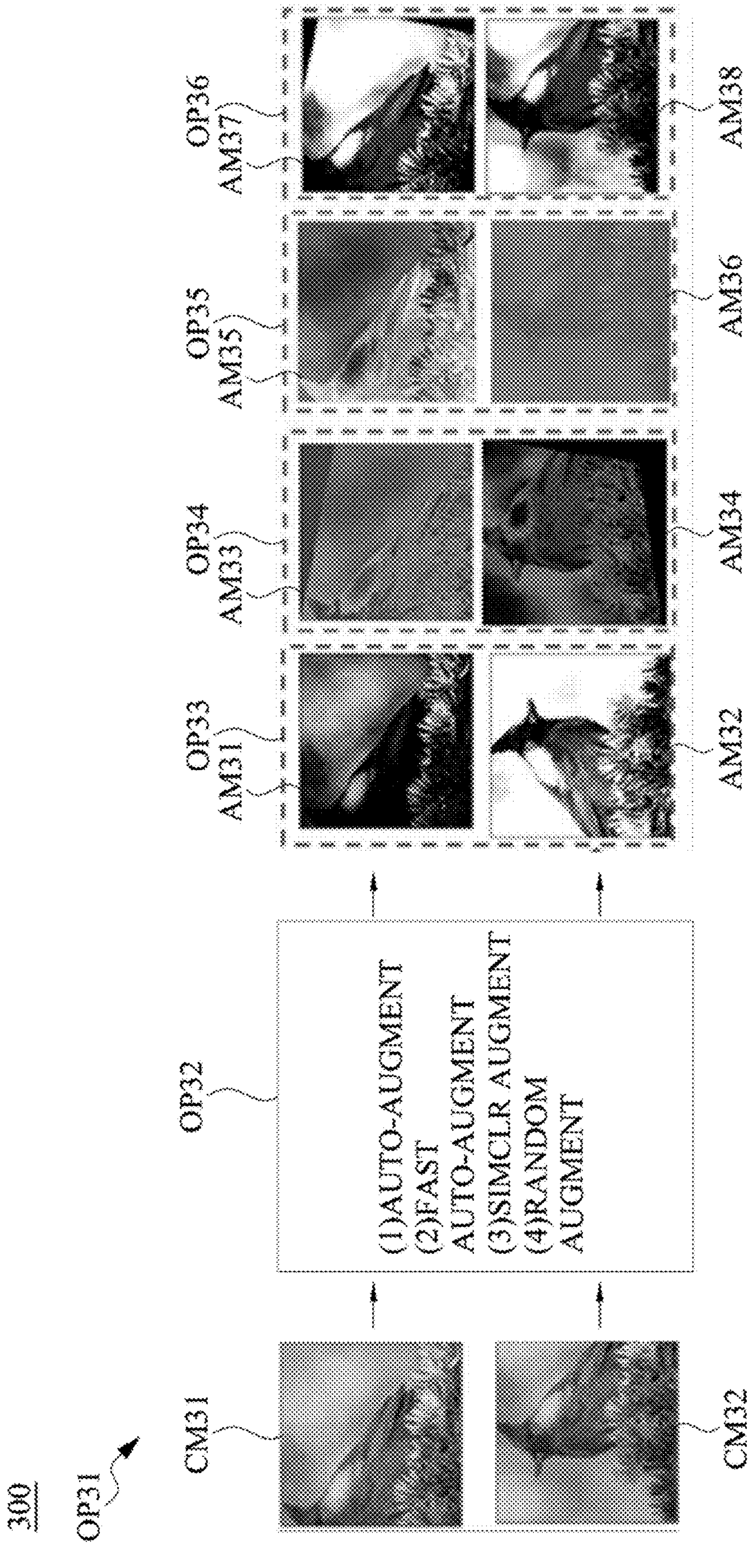
FIG. 3A is a schematic diagram of a method of generating augmentation images, illustrated according to some embodiment of this disclosure.

FIG. 3A is a schematic diagram of a method 300 of generating augmentation images, illustrated according to some embodiment of this disclosure. As illustratively shown in FIG. 3A, the method 300 can include operations OP31-OP36.

During the operation OP31, the processor is configured to generate crop images CM31 and CM32. Referring to FIG. 1 and FIG. 3A, the operation OP31 can be performed by a part or all of the method 100 and 200. The crop images CM31 and CM32 can be embodiments of the portion images PM21, PM22, the global image GM1 and the local images LM1-LM4.

During the operation OP32, the processor is configured to select one augmentation pipeline from various augmentation pipelines different from each other. In the embodiment shown in FIG. 3A, the processor stores four augmentation pipelines, those are auto-augment pipeline, fast auto-augment pipeline, SimCLR augment pipeline and random augment pipeline. However, the present disclosure is not limited to this. In various embodiments, the processor can select in various numbers of augmentation pipelines.

Then, during the operation OP33, in response to the processor selecting the SimCLR augment pipeline, the processor processes the crop images CM31 and CM32 by the SimCLR augment pipeline, to generate the augmentation images AM31 and AM32, respectively.

Similarly, during the operation OP34, in response to the processor selecting the random augment pipeline, the processor processes the crop images CM31 and CM32 by the random augment pipeline, to generate the augmentation images AM33 and AM34, respectively.

Similarly, during the operation OP35, in response to the processor selecting the auto-augment pipeline, the processor processes the crop images CM31 and CM32 by the auto-augment pipeline, to generate the augmentation images AM35 and AM36, respectively.

Similarly, during the operation OP36, in response to the processor selecting the fast auto-augment pipeline, the processor processes the crop images CM31 and CM32 by the fast auto-augment pipeline, to generate the augmentation images AM37 and AM38, respectively.

In some approaches, the augmentation images are generated manually, and thus the differences between the augmentation images are smaller.

Compared to above approaches, in the embodiments of present disclosure, the processor generates the augmentation images AM31-AM38 by four different augmentation pipelines. As a result, the differences between the augmentation images AM31-AM38 are larger.

Figure 3B:
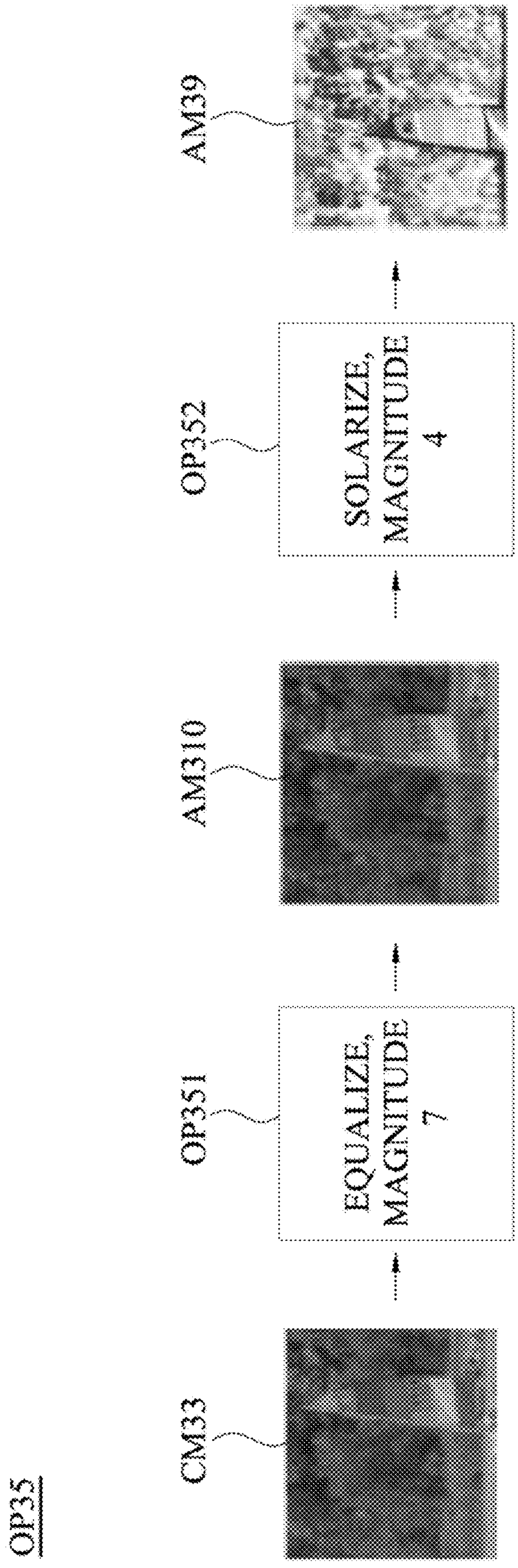
FIG. 3B is a schematic diagram of further details of the operation shown in FIG. 3A, illustrated according to some embodiment of this disclosure.

FIG. 3B is a schematic diagram of further details of the operation OP35 shown in FIG. 3A, illustrated according to some embodiment of this disclosure. In the embodiments, the operation OP35 is configured to perform augmentation process to a crop image CM33 to generate an augmentation image AM39. Referring to FIG. 3A and FIG. 3B, the crop image CM33 is an embodiment of the crop image CM31 or CM32, and the augmentation image AM39 is an embodiment of the augmentation image AM35 or AM36.

As illustratively shown in FIG. 3B, the operation OP35 can include operations OP351-OP352. During the operation OP35, in response to the processor selecting the auto-augment pipeline, the processor randomly selects one sub-policy from multiple sub-policies included in the auto-augment pipeline. In the embodiment shown in FIG. 3B, the processor selects a sub-policy including the operations OP351-OP352.

During the operation OP351, the processor is configured to performs an equalize process to the crop image CM33 with a magnitude 7, to generate an augmentation image AM310.

During the operation OP352, the processor is configured to performs a solarize process to the augmentation image AM310 with a magnitude 4, to generate the augmentation image AM39.

In other embodiments, the processor can also select other sub-policy from the multiple sub-policies included in the auto-augment pipeline. For example, in response to the processor selecting another sub-policy, the processor can perform a posterize process to the crop image CM33 with a magnitude 8, and perform a rotation process with a magnitude 9 to generate the augmentation image AM39.

Similarly, the fast auto-augment pipeline and the random augment pipeline can also include multiple sub-policies. Correspondingly, during the operations OP34 and OP36, operations similar with the operation OP35 can be performed.

Figure 4A:
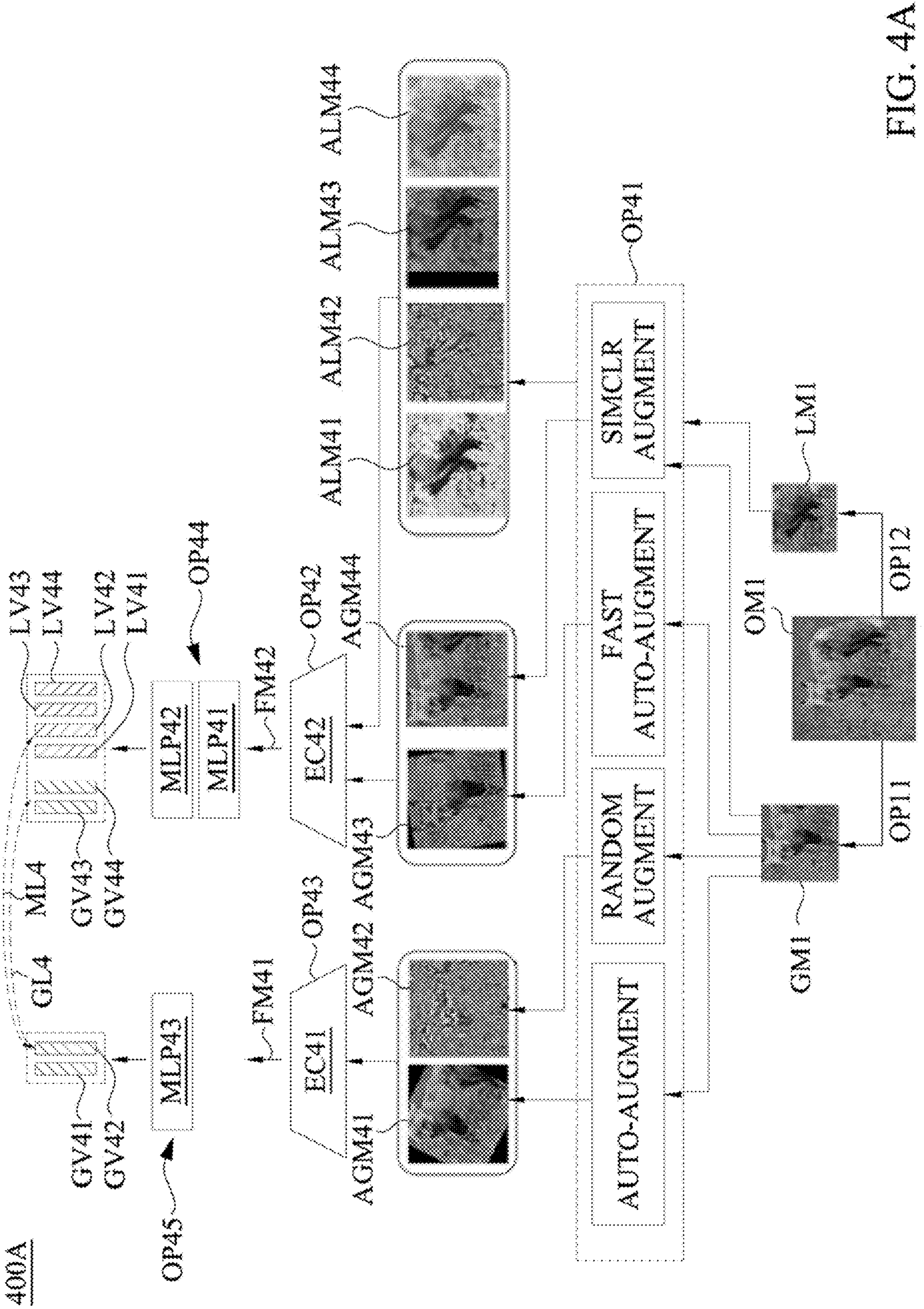
FIG. 4A is a schematic diagram of a machine learning method, illustrated according to some embodiment of this disclosure.

FIG. 4A is a schematic diagram of a machine learning method 400A, illustrated according to some embodiment of this disclosure. Referring to FIG. 4A and FIG. 1, the machine learning method 400A includes the operations OP11 and OP12 for cropping the original image OM1 to generate the global image GM1 and the local image LM1. Furthermore, machine learning method 400A further includes the operations OP41-OP45.

During the operation OP41, the processor is configured to process the global image GM1 by the auto-augment pipeline to generate an augmentation global image AGM41, process the global image GM1 by the random augment pipeline to generate an augmentation global image AGM42, process the global image GM1 by the fast auto-augment pipeline to generate an augmentation global image AGM43, and process the global image GM1 by the SimCLR augment pipeline to generate an augmentation global image AGM44.

Furthermore, during the operation OP41, the processor is configured to process the local image LM1 by the auto-augment pipeline to generate a augmentation local image ALM41, process the local image LM1 by the random augment pipeline to generate a augmentation local image ALM42, process the local image LM1 by the fast auto-augment pipeline to generate a augmentation local image ALM43, and process the local image LM1 by the SimCLR augment pipeline to generate a augmentation local image ALM44.

In some embodiments, before the method 400A is performed, parameters of the sub-policies of the auto-augment pipeline are generated by the processor training according to a data set including the original image OM1. On the other hand, when the method 400A is performed, parameters of the sub-policies of the random augment pipeline are generated randomly by the processor. Alternatively stated, the parameters of the auto-augment pipeline are associated with the original image OM1, and the parameters of the random augment pipeline are not associated with the original image OM1 and are generated after the parameters of the auto-augment pipeline are generated.

In some embodiments, before the method 400A is performed, parameters of the sub-policies of the fast auto-augment pipeline and parameters of the sub-policies of the SimCLR augment pipeline are also generated by the processor training according to the data set including the original image OM1.

During the operation OP42, an encoder EC42 is configured to process the augmentation global images AGM43, AGM44 and augmentation local images ALM41-ALM44 to generate multiple corresponding feature maps FM42.

During the operation OP43, an encoder EC41 is configured to process the augmentation global image AGM41 and AGM42 to generate multiple corresponding feature maps FM41.

In some embodiments, the encoders EC41 and EC42 are mutually associated with following equation (1):

$$\xi \leftarrow \tau\xi + (1-\tau)\theta. \tag{1}$$

In which $\xi$ is a parameter of the encoder EC41, $\theta$ is a parameter of the encoder EC42, and $\tau$ is a parameter of the association between the encoders EC41 and EC42.

During the operation OP44, the processor is configured to process the feature maps FM42 by neural networks MLP41 and MLP42 in order to generate corresponding global representation vectors GV43, GV44 and local representation vectors LV41-LV44. In which the global representation vectors GV43, GV44 and the local representation vectors LV41-LV44 correspond to the augmentation global images AGM43, AGM44 and the augmentation local images ALM41-ALM44, respectively.

During the operation OP45, the processor is configured to process the feature maps FM41 by a neural network MLP43 to generate corresponding global representation vectors GV41 and GV42. In which the global representation vectors GV41 and GV42 correspond to the augmentation global images AGM41 and AGM42, respectively.

Then, the processor can compare the global representation vectors GV41 and GV42 with the global representation vectors GV43 and GV44 to generate a global loss function GL4, and compare the global representation vectors GV41 and GV42 with the local representation vectors LV41-LV44 to generate a mixed loss function ML4.

For example, when a similarity between the global representation vectors GV41, GV42 and the global representation vectors GV43, GV44 is larger, a value of the global loss function GL4 is smaller. When a similarity between the global representation vectors GV41, GV42 and the local representation vectors LV41-LV44 is larger, a value of the mixed loss function ML4 is smaller.

In some embodiments, the processor is further configured to sum the global loss function GL4 and the mixed loss function ML4 to generate a cross view loss function CVL4 (not shown in figures). Then, the processor is further configured to adjust weight parameters of the encoder EC42 according to the cross view loss function CVL4.

For example, after the weight parameters of the encoder EC42 are adjusted, the processor can perform the operations OP42-OP43 again by the adjusted encoder EC42, to generate a new cross view loss function CVL4. In some embodiments, the processor can adjust the weight parameters of the encoder EC42 gradually, until the cross view loss function CVL4 has a minimum value.

In some embodiments, once in a while, the processor is configured to copy the weight parameters of the adjusted encoder EC42 to the encoder EC41, such that weight parameters of the encoder EC41 can be adjusted accordingly. Alternatively stated, the weight parameters of the encoder EC41 can also be adjusted according to the cross view loss function CVL4 by the encoder EC42. In some embodiments, the operations of adjusting the weight parameters described above are referred to as training the encoder EC41 and EC42.

In some embodiments, the neural networks MLP41-MLP43 can be implemented by multilayer perceptrons (MLP). For example, the neural networks MLP41 and MLP43 can be implemented by projectors, and the neural network MLP42 can be implemented by predictors.

In some embodiments, after the encoder EC41 or EC42 is trained, the processor can perform practical application for downstream tasks, such as tasks of determining whether belonging to a category. When the downstream tasks are performed, the encoder EC41 or EC42 outputs feature maps to neural networks corresponding to the downstream tasks.

In the embodiment shown in FIG. 4A, the processor is configured to process the single global image GM1 and the single local image LM1 with multiple augmentation pipelines. Correspondingly, in some embodiments, the machine learning method 400A is referred to as a machine learning method of multi-augmentations single-view.

In some approaches, augmentation images are generated by a single augmentation pipeline, and thus differences between the augmentation images are smaller.

Compared to above approaches, in some embodiments of present disclosure, the processor generates the augmentation global images AGM41-AGM44 and the augmentation local images ALM41-ALM44 by four different augmentation pipelines. Accordingly, differences between the augmentation global images AGM41-AGM44 and the augmentation local images ALM41-ALM44 are larger.

Figure 4B:
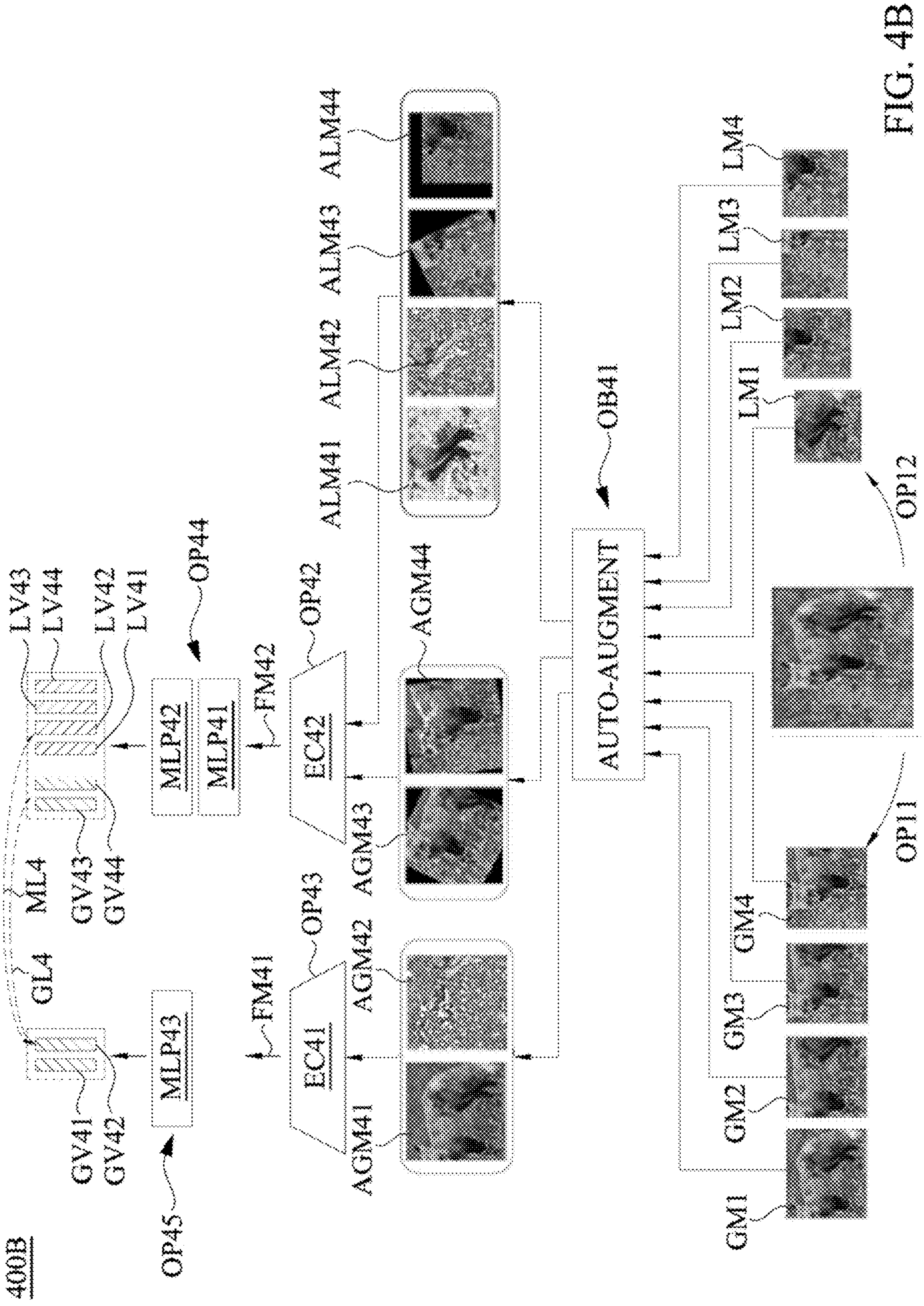
FIG. 4B is a schematic diagram of a machine learning method, illustrated according to some embodiment of this disclosure.

FIG. 4B is a schematic diagram of a machine learning method 400B, illustrated according to some embodiment of this disclosure. Referring to FIG. 4A and FIG. 4B, the machine learning method 400B is an alternative embodiment of the machine learning method 400A. Therefore, for brevity, some details are not repeated for brevity.

Compared to the machine learning method 400A, the machine learning method 400B includes an operation OB41 instead of the operation OP41. During the operation OB41, the processor is configured to process the global images GM1-GM4 and the local images LM1-LM4 by the auto-augment pipeline to generate the augmentation global images AGM41-AGM44 and augmentation local images ALM41-ALM44, respectively.

Then, the processor performs operations OP42-OP45 to the augmentation global images AGM41-AGM44 and augmentation local images ALM41-ALM44, to train the encoders EC41 and EC42. The details of the operations OP42-OP45 are described above in the embodiments associated with FIG. 4A, and thus not repeated.

In the embodiment shown in FIG. 4B, the processor is configured to process multiple global images GM1-GM4 and multiple local images LM1-LM4 by a single augmentation pipeline. Correspondingly, in some embodiments, the machine learning method 400B is referred to as a machine learning method of single-augmentation multi-views.

In some approaches, when training is performed to encoders, only single view images are used for training, such that the training result is poor.

Compared to above approaches, in some embodiments of present disclosure, the processor performs training with multiple global images GM1-GM4 and multiple local images LM1-LM4. Accordingly, the training result is improved.

FIG. 5 is a schematic diagram of a machine learning method 500, illustrated according to some embodiment of this disclosure. As illustratively shown in FIG. 5, the machine learning method 500 includes operations OP51-OP58.

During the operation OP51, the processor is configured to crop the original image OM1 according to crop threshold ratios CTHR1 and CTHR2 to generate multiple global images.

During the operation OP52, the processor is configured to crop the original image OM1 according to crop threshold ratios CTHR3 and CTHR4 to generate multiple local images.

Referring to FIG. 1 and FIG. 5, the operation OP51 is similar with the operation OP11, and the operation OP52 is similar with the operations OP12-OP15. Therefore, for brevity, some descriptions are not repeated.

During the operation OP53, the processor is configured to check whether the global images and the local images generated from the operations OP51 and OP52 are valid crop images. When the global images generated from the operation OP51 are valid crop images, the processor is configured to output the valid global images (such as the global images GM1 and GM2) to perform following operations. When the local images generated from the operation OP52 are valid crop images, the processor is configured to output the valid local images (such as the local images LM1-LM6) to perform following operations.

Referring to FIG. 2 and FIG. 5, the operation OP53 is similar with the method 200. Therefore, for brevity, some descriptions are not repeated.

Then, during the operation OP54, the processor is configured to process the global images GM1, GM2 and the local images LM1-LM6 to generate augmentation global image groups AGG1-AGG4 and augmentation local image groups ALG1-ALG6.

In the embodiment shown in FIG. 5, during the operation OP54, the processor is configured to process the global image GM1 with the auto-augment pipeline and the random augment pipeline to generate two augmentation global images in the augmentation global image group AGG1, respectively, and process the global image GM2 with the auto-augment pipeline and the random augment pipeline to generate two augmentation global images in the augmentation global image group AGG2, respectively.

Similarly, during the operation OP54, the processor is configured to process the global image GM1 with the fast auto-augment pipeline and the SimCLR augment pipeline to generate two augmentation global images in the augmentation global image group AGG3, respectively, and process the global image GM2 with the fast auto-augment pipeline and the SimCLR augment pipeline to generate two augmentation global images in the augmentation global image group AGG4, respectively.

Similarly, during the operation OP54, the processor is configured to process the local image LM1 with the auto-augment pipeline, the random augment pipeline, the fast auto-augment pipeline and the SimCLR augment pipeline to generate four augmentation local images in the augmentation local image group ALG1, respectively.

Similarly, during the operation OP54, the processor is configured to process the local image LM2 with the auto-augment pipeline, the random augment pipeline, the fast auto-augment pipeline and the SimCLR augment pipeline to generate four augmentation local images in the augmentation local image group ALG2, respectively.

Similarly, during the operation OP54, the processor is configured to process the local image LM3 with the auto-augment pipeline, the random augment pipeline, the fast auto-augment pipeline and the SimCLR augment pipeline to generate four augmentation local images in the augmentation local image group ALG3, respectively.

Similarly, during the operation OP54, the processor is configured to process the local image LM4 with the auto-augment pipeline, the random augment pipeline, the fast auto-augment pipeline and the SimCLR augment pipeline to generate four augmentation local images in the augmentation local image group ALG4, respectively.

Similarly, during the operation OP54, the processor is configured to process the local image LM5 with the auto-augment pipeline, the random augment pipeline, the fast auto-augment pipeline and the SimCLR augment pipeline to generate four augmentation local images in the augmentation local image group ALG5, respectively.

Similarly, during the operation OP54, the processor is configured to process the local image LM6 with the auto-augment pipeline, the random augment pipeline, the fast auto-augment pipeline and the SimCLR augment pipeline to generate four augmentation local images in the augmentation local image group ALG6, respectively.

Referring to FIG. 4A and FIG. 5, the augmentation global images AGM41 and AGM42 can be included in the augmentation global image group AGG1, and the augmentation local images ALM41-ALM44 can be included in the augmentation local image group ALG1.

Then, during the operation OP55, the encoder EC42 is configured to process the augmentation global image group AGG3, AGG4 and the augmentation local image group ALG1-ALG6 to generate multiple corresponding feature maps FM52.

During the operation OP56, the encoder EC41 is configured to process the augmentation global image group AGG1, AGG2 to generate multiple corresponding feature maps FM51.

Referring to FIG. 4A and FIG. 5, the feature maps FM41 can include the feature maps FM51, and the feature maps FM42 can include the feature maps FM52.

During the operation OP57, the processor is configured to process the feature maps FM52 by the neural networks MLP41 and MLP42 in order to generate a corresponding global representation vector group GVG2 and a local representation vector group LVG1. In which the global representation vector group GVG2 corresponds to the augmentation global image groups AGG3 and AGG4, and the local representation vector group LVG1 correspond to the augmentation local image group ALG1-ALG6.

During the operation OP58, the processor is configured to process the feature maps FM51 by the neural network MLP43 to generate a corresponding global representation vector group GVG1. In which the global representation vector group GVG1 corresponds to the augmentation global image groups AGG1 and AGG2.

Referring to FIG. 4A and FIG. 5, the global representation vectors GV41 and GV42 can be included in the global representation vector group GVG1, the global representation vectors GV43 and GV44 can be included in the global representation vector group GVG2, and the local representation vectors LV41-LV44 can be included in the local representation vector group LVG1.

Then, the processor can compare the global representation vector group GVG1 with the global representation vector group GVG2 to generate a global loss function GL5, and compare the global representation vector group GVG1 with the local representation vector group LVG1 to generate a mixed loss function ML5.

For example, when a similarity between the global representation vector groups GVG1 and GVG2 is larger, a value of the global loss function GL5 is smaller. When a similarity between the global representation vector group GVG1 and the local representation vector group LVG1 is larger, a value of the mixed loss function ML5 is smaller.

In some embodiments, the processor is further configured to sum the global loss function GL5 and the mixed loss function ML5 to generate a cross view loss function CVL5 (not shown in figures). Then, the processor is further configured to adjust weight parameters of the encoder EC42 according to the cross view loss function CVL5.

For example, after the weight parameters of the encoder EC42 are adjusted, the processor can perform the operations OP55-OP58 again by the adjusted encoder EC42, to generate a new cross view loss function CVL5. In some embodiments, the processor can adjust the weight parameters of the encoder EC42 gradually, until the cross view loss function CVL5 has a minimum value.

Referring to FIG. 4A and FIG. 5 the method 500 is an alternative embodiment of the method 400A. Therefore, for brevity, some descriptions are not repeated. In which the operations OP55-OP58 correspond to the operations OP42-OP45, respectively. The feature maps FM41 and FM42 correspond to the feature maps FM51 and FM52, respectively. The global representation vector group GVG1 correspond to the global representation vectors GV41 and GV42. The global representation vector group GVG2 correspond to the global representation vectors GV43 and GV44. The local representation vector group LVG1 correspond to the local representation vectors LV41-LV44. The global loss function GL5 and the mixed loss function ML5 correspond to the global loss function GL4 and the mixed loss function ML4, respectively.

In some embodiments, the cross view loss function CVL5 can be represented by equation (2) following:

$$CVL5 = -\sum_{i=1}^{R}\sum_{t=1}^{R'}\left(\frac{\langle z_G^{(i)}, z_G^{(t)}\rangle}{\|z_G^{(i)}\|_2 \cdot \|z_G^{(t)}\|_2} + \lambda\sum_{j}^{K}\frac{\langle z_G^{(i)}, z_L^{(j)}\rangle}{\|z_G^{(i)}\|_2 \cdot \|z_L^{(j)}\|_2}\right); \quad (2)$$

In which $z_G^{(i)}$ represents global representation vectors in the global representation vector group GVG1, $z_G^{(t)}$ represents global representation vectors in the global representation vector group GVG2, $z_L^{(j)}$ represents local representation vectors in the local representation vector group LVG1, $\|z_G^{(i)}\|, \|z_G^{(t)}\|$ and $\|z_L^{(j)}\|$ represent lengths of $z_G^{(i)}, z_G^{(t)}$ and $z_L^{(j)}$, respectively, $\langle z_G^{(i)}, z_G^{(t)}\rangle$ represents an inner product between $z_G^{(i)}$ and $z_G^{(t)}, \langle z_G^{(i)}, z_L^{(j)}\rangle$ represents an inner product between $z_G^{(i)}$ and $z_L^{(j)}$, R, R' and K represent quantities of $z_G^{(i)}, z_G^{(t)}$ and $z_L^{(j)}$, respectively, λ represents a weight coefficient. In some better embodiments, λ is 0.4.

In the embodiment shown in FIG. 5, in response to the augmentation global image groups AGG1 and AGG2 included 4 augmentation global images in total, R is equal to 4. In response to the augmentation global image groups AGG3 and AGG4 included 4 augmentation global images in total, R' is equal to 4. In response to the augmentation local image groups ALG1-ALG6 included 24 augmentation local images in total, K is equal to 24.

In some embodiments, the cross view loss function CVL4 also can be represented by equation (2). In the embodiment shown in FIG. 4A, in response to a quantity of the global representation vectors GV41 and GV42 is 2, R is equal to 2. In response to a quantity of the global representation vectors GV43 and GV42 is 2, R' is equal to 2. In response to a quantity of the local representation vectors LV41-LV44 is 4, K is equal to 4.

Figure 6:
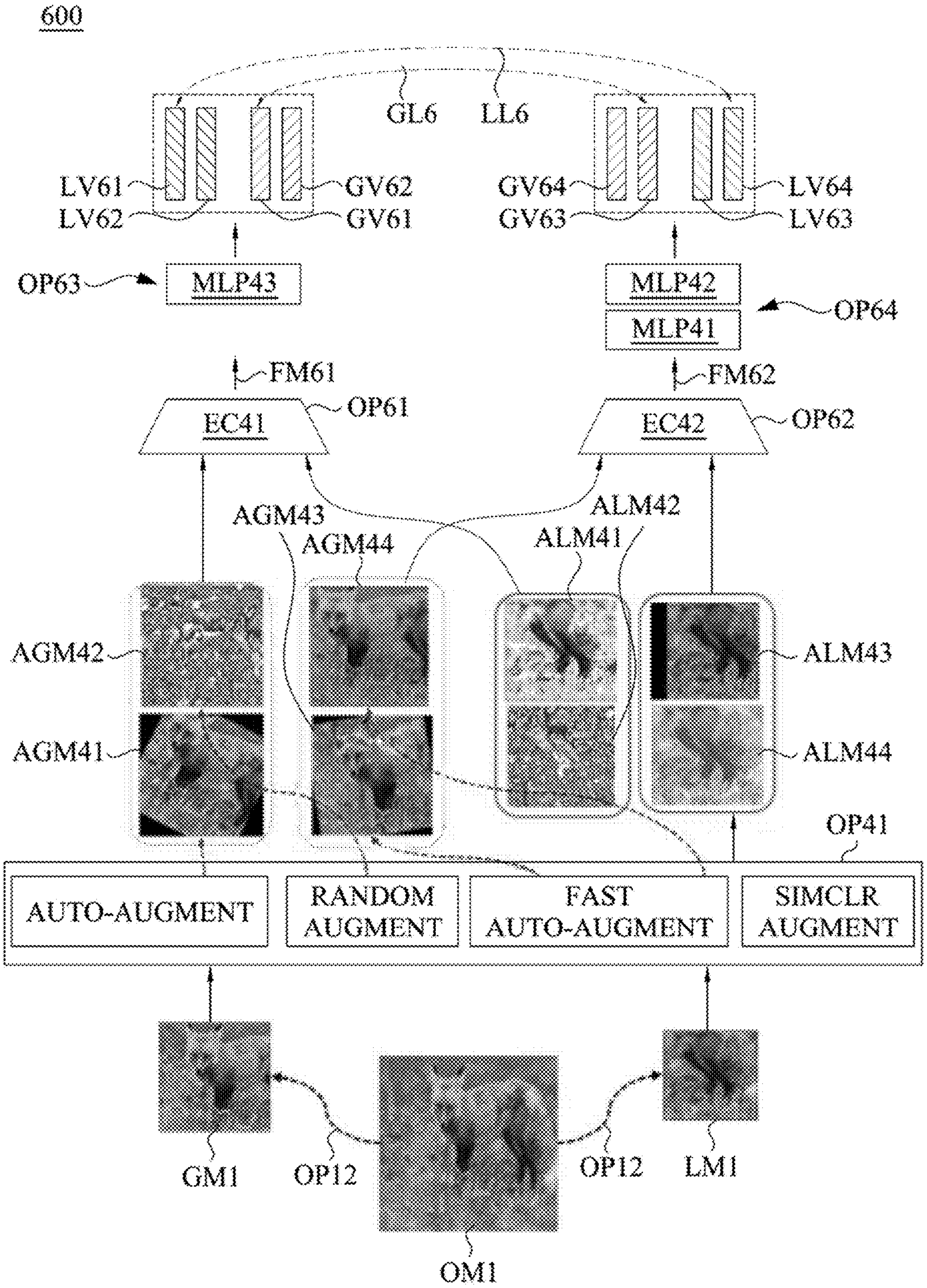
FIG. 6 is a schematic diagram of a machine learning method, illustrated according to some embodiment of this disclosure.

FIG. 6 is a schematic diagram of a machine learning method 600, illustrated according to some embodiment of this disclosure. Referring to FIG. 4A and FIG. 6, the machine learning method 600 is an alternative embodiment of the machine learning method 400A. Therefore, some descriptions are not repeated for brevity. Compared to the machine learning method 400A, the machine learning method 600 includes operations OP61-OP64 instead of the operations OP42-OP45.

During the operation OP61, the encoder EC41 is configured to process the augmentation global images AGM41, AGM42 and augmentation local images ALM41. ALM42 to generate multiple corresponding feature maps FM61.

During the operation OP62, the encoder EC42 is configured to process the augmentation global images AGM43, AGM44 and augmentation local images ALM43. ALM44 to generate multiple corresponding feature maps FM62.

During the operation OP63, the processor is configured to process the feature maps FM61 by the neural network MLP43 to generate corresponding global representation vectors GV61, GV62 and local representation vectors LV61, LV62. In which the global representation vectors GV61, GV62 and local representation vectors LV61, LV62 correspond to the augmentation global images AGM41, AGM42 and the augmentation local images ALM41, ALM42, respectively.

During the operation OP64, the processor is configured to process the feature maps FM62 by the neural networks MLP41 and MLP42 in order to generate corresponding global representation vectors GV63, GV64 and local representation vectors LV63, LV64. In which the global representation vectors GV63, GV64 and local representation vectors LV63, LV64 correspond to the augmentation global images AGM43, AGM44 and the augmentation local images ALM43, ALM44, respectively.

Referring to FIG. 6 and FIG. 4A, the global representation vectors GV61-GV64 and the local representation vectors LV63, LV64 are the global representation vectors GV41-GV44 and the local representation vectors LV43, LV44, respectively. Therefore, for brevity, some descriptions are not repeated.

Then, the processor can compare the global representation vectors GV61 and GV62 with the global representation vectors GV63 and GV64 to generate a global loss function GL6, and compare the local representation vectors LV61 and LV62 with the local representation vectors LV63, LV64 to generate a local loss function LL6.

For example, when a similarity between the global representation vectors GV61, GV62 and the global representation vectors GV63, GV64 is larger, a value of the global loss function GL6 is smaller. When a similarity between the local representation vectors LV61 and LV62 with the local representation vectors LV63, LV64 is larger, a value of the local loss function LL6 is smaller.

In some embodiments, the processor is further configured to sum the global loss function GL6 and the local loss function LL6 to generate a multi-view loss function MVL6 (not shown in figures). Then, the processor is further configured to adjust weight parameters of the encoder EC42 according to the multi-view loss function MVL6.

For example, after the weight parameters of the encoder EC42 are adjusted, the processor can perform the operations OP61-OP64 again by the adjusted encoder EC42, to generate a new multi-view loss function MVL6. In some embodiments, the processor can adjust the weight parameters of the encoder EC42 gradually, until the multi-view loss function MVL6 has a minimum value.

In some embodiments, once in a while, the processor is configured to copy the weight parameters of the adjusted encoder EC42 to the encoder EC41, such that weight parameters of the encoder EC41 can be adjusted accordingly. Alternatively stated, the weight parameters of the encoder EC41 can also be adjusted according to the multi-view loss function MVL6 by the encoder EC42.

In some embodiments, the global loss function GL6, the local loss function LL6 and the multi-view loss function MVL6 can be represented by following equations (3)-(5):

$$GL6 = -\sum_{i=1}^{R}\sum_{t=1}^{R'} \frac{\left\langle z_G^{(i)}, z_G^{(t)} \right\rangle}{\left\|z_G^{(i)}\right\|_2 \cdot \left\|z_G^{(t)}\right\|_2}; \tag{3}$$

$$LL6 = -\sum_{i=1}^{K}\sum_{t=1}^{K'} \frac{\left\langle z_L^{(i)}, z_L^{(t)} \right\rangle}{\left\|z_L^{(i)}\right\|_2 \cdot \left\|z_L^{(t)}\right\|_2}; \tag{4}$$

$$MVL6 = GL6 + \lambda * LL6; \tag{5}$$

In which $$z_G^{(i)}$$

represents the $$z_G^{(i)}$$

represents global representation vectors generated by the encoder EC41, $$z_G^{(t)}$$

represents global representation vectors generated by the encoder EC42, $$z_L^{(j)}$$

represents local representation vectors generated by the encoder EC41, $$z_L^{(t)}$$

represents local representation vectors generated by the encoder EC42, $$\left\|z_G^{(i)}\right\|, \left\|z_G^{(t)}\right\|, \left\|z_L^{(j)}\right\|$$

and $$\left\|z_L^{(t)}\right\|$$

represent lengths of $$z_G^{(i)}, z_G^{(t)},$$

$$z_L^{(j)}$$

and $$z_L^{(t)},$$

respectively, $$\langle z_G^{(i)}, z_G^{(t)} \rangle$$

represents an inner product between $$z_G^{(i)}$$

and $$z_G^{(t)}, \langle z_G^{(i)}, z_L^{(j)} \rangle$$

represents an inner product between $$z_G^{(i)}$$

and $$z_L^{(j)}, \langle z_L^{(i)}, z_L^{(t)} \rangle$$

represents an inner product between $$z_L^{(i)}$$

and $$z_L^{(t)},$$

R, R', K and K' represent quantities of $$z_G^{(i)}, z_G^{(t)}, z_L^{(j)}$$

and $$z_L^{(t)},$$

respectively, λ represents a weight coefficient. In some better embodiments, λ is 0.4.

In the embodiment shown in FIG. 6, in response to two global representation vectors GV61, GV62 and two local representation vectors LV61, LV62 are generated by the encoder EC41, R is equal to 2 and K is equal to 2. In response to two global representation vectors GV63, GV64 and two local representation vectors LV63, LV64 are generated by the encoder EC42, R' is equal to 2 and K' is equal to 2.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A machine learning method, comprising:

cropping an original image to generate a first global image;

cropping the original image to generate a first local image;

processing the first global image by a first augmentation pipeline to generate a first augmentation global image;

processing the first global image by a second augmentation pipeline to generate a second augmentation global image;

processing the first local image by the first augmentation pipeline to generate a first augmentation local image;

processing the first augmentation global image by a first encoder to generate a first global representation vector;

processing the second augmentation global image and the first augmentation local image by a second encoder to generate a second global representation vector and a first local representation vector;

at least comparing the first global representation vector and the second global representation vector to generate a global loss function;

comparing the first global representation vector and the first local representation vector to generate a mixed loss function; and adjusting the second encoder according to the global loss function and the mixed loss function, wherein the first augmentation pipeline is different from the second augmentation pipeline.

2. The machine learning method of claim 1, wherein adjusting the second encoder according to the global loss function and the mixed loss function comprises:

summing the global loss function and the mixed loss function to generate a cross view loss function; and adjusting the second encoder according to the cross view loss function.

3. The machine learning method of claim 1, wherein generating the first global image comprises:

selecting a first ratio value and a second ratio value between a first crop threshold ratio and a second crop threshold ratio; and cropping the original image according to the first ratio value and the second ratio value, wherein the first crop threshold ratio is smaller than the second crop threshold ratio.

4. The machine learning method of claim 3, wherein generating the first local image comprising:

selecting a third ratio value and a fourth ratio value between a third crop threshold ratio and a fourth crop threshold ratio; and cropping the original image according to the third ratio value and the fourth ratio value, wherein the third crop threshold ratio is smaller than the fourth crop threshold ratio.

5. The machine learning method of claim 4, wherein the fourth crop threshold ratio is equal to the first crop threshold ratio.

6. The machine learning method of claim 5, wherein the fourth crop threshold ratio is equal to 0.3.

7. The machine learning method of claim 1, further comprising:

processing the first global image by a third augmentation pipeline to generate a third augmentation global image; and processing the third augmentation global image by the first encoder to generate a third global representation vector, wherein generating the global loss function comprising at least comparing the third global representation vector and the second global representation vector to generate the global loss function.

8. The machine learning method of claim 7, wherein generating the mixed loss function comprising at least comparing the third global representation vector and the first local representation vector to generate the mixed loss function.

9. The machine learning method of claim 8, wherein the first augmentation pipeline, the second augmentation pipeline and the third augmentation pipeline are different from each other.

10. The machine learning method of claim 1, further comprising:

cropping the original image to generate a second global image;

processing the second global image by the first augmentation pipeline and the second augmentation pipeline to generate a first augmentation global image group;

at least processing the first augmentation global image group by the first encoder to generate a first global representation vector group;

processing the second augmentation global image by a third augmentation pipeline and a fourth augmentation pipeline to generate a second augmentation global image group;

at least processing the second augmentation global image group by the second encoder to generate a second global representation vector group; and comparing the first global representation vector group and the second global representation vector group to generate the global loss function.

11. The machine learning method of claim 10, wherein the first global representation vector group and the second global representation vector group include the first global representation vector and the second global representation vector, respectively.

12. The machine learning method of claim 11, wherein the first augmentation pipeline, the second augmentation pipeline, the augmentation pipeline and the fourth augmentation pipeline are different from each other.

13. The machine learning method of claim 12, further comprising:

cropping the original image to generate a second local image;

processing the second local image by the first augmentation pipeline, the second augmentation pipeline, the augmentation pipeline and the fourth augmentation pipeline to generate a first augmentation local image group;

at least processing the first augmentation local image group by the second encoder to generate a first local representation vector group; and comparing the first global representation vector group and the first local representation vector group to generate the mixed loss function, wherein the first local representation vector group includes the first local representation vector.

14. A machine learning method, comprising:

cropping an original image to generate a first global image and a second global image;

cropping the original image to generate a first local image and a second local image;

processing the first global image and the second global image by an augmentation pipeline to generate a first augmentation global image and a second augmentation global image;

processing the first local image and the second local image by the augmentation pipeline to generate a first augmentation local image and a second augmentation local image;

processing the first augmentation global image and the second augmentation global image by a first encoder to generate a first global representation vector and a second global representation vector;

processing the first augmentation local image and the second augmentation local image by a second encoder to generate a first local representation vector and a second local representation vector;

at least comparing the first global representation vector, the second global representation vector and the first local representation vector, the second local representation vector to generate a mixed loss function; and adjusting the second encoder according to the mixed loss function.

15. The machine learning method of claim 14, further comprising:

cropping an original image to generate a third global image and a fourth global image;

processing the third global image and the fourth global image by an augmentation pipeline to generate a third augmentation global image and a fourth augmentation global image;

processing the third augmentation global image and the fourth augmentation global image by the second encoder to generate a third global representation vector and a fourth global representation vector;

at least comparing the first global representation vector, the second global representation vector and the third global representation vector, the fourth global representation vector to generate a global loss function; and summing the global loss function and the mixed loss function to generate a cross view loss function, wherein adjusting the second encoder comprises adjusting the second encoder according to the cross view loss function.

16. A machine learning method, comprising:

cropping an original image to generate a first global image;

cropping the original image to generate a first local image;

processing the first global image by a first augmentation pipeline and a second augmentation pipeline to generate a first augmentation global image and a second augmentation global image;

processing the first local image by the first augmentation pipeline and the second augmentation pipeline to generate a first augmentation local image and a second augmentation local image;

processing the first global image by a third augmentation pipeline and a fourth augmentation pipeline to generate a third augmentation global image and a fourth augmentation global image;

processing the first local image by the third augmentation pipeline and the fourth augmentation pipeline to generate a third augmentation local image and a fourth augmentation local image;

processing the first augmentation global image, the second augmentation global image, the first augmentation local image and the second augmentation local image by a first encoder to generate a first global representation vector, a second global representation vector, a first local representation vector and a second local representation vector;

processing the third augmentation global image, the fourth augmentation global image, the third augmentation local image and the fourth augmentation local image by a second encoder to generate a third global representation vector, a fourth global representation vector, a third local representation vector and a fourth local representation vector;

comparing the first global representation vector, the second global representation vector and the third global representation vector, the fourth global representation vector to generate a global loss function;

comparing the first local representation vector, the second local representation vector and the third local representation vector, the fourth local representation vector to generate a local loss function;

summing the global loss function and the local loss function to generate a multi-view loss function; and adjusting the second encoder according to the multi-view loss function.

17. The machine learning method of claim 16, wherein generating the first global image comprises:

selecting a first ratio value and a second ratio value between a first crop threshold ratio and a second crop threshold ratio; and cropping the original image according to the first ratio value and the second ratio value, wherein the first crop threshold ratio is smaller than the second crop threshold ratio.

18. The machine learning method of claim 17, wherein generating the first local image comprising:

selecting a third ratio value and a fourth ratio value between a third crop threshold ratio and a fourth crop threshold ratio; and cropping the original image according to the third ratio value and the fourth ratio value, wherein the third crop threshold ratio is smaller than the fourth crop threshold ratio.

19. The machine learning method of claim 18, wherein the fourth crop threshold ratio is equal to the first crop threshold ratio.

20. The machine learning method of claim 19, wherein the fourth crop threshold ratio is equal to 0.3.

* * * * *